United States Patent [19]

Teixeira

[11] 4,014,390
[45] Mar. 29, 1977

[54] BEACH CLEANER APPARATUS

[76] Inventor: Antone S. Teixeira, 4050-F Keanu St., Honolulu, Hawaii 96816

[22] Filed: Feb. 13, 1974

[21] Appl. No.: 442,193

[52] U.S. Cl. .................... 171/124; 171/63; 56/328 R
[51] Int. Cl.² ............................. A01D 17/00
[58] Field of Search ............ 171/63, 126, 71, 63, 171/111, 124, 135, 110; 56/328 R, 330; 172/32, 33

[56] References Cited

UNITED STATES PATENTS

| 1,085,162 | 1/1914 | Rose ........................... 171/15 |
| 1,233,805 | 7/1917 | Pretlow ....................... 171/71 |
| 1,378,275 | 5/1921 | Rademacher ............. 56/328 R |
| 1,815,087 | 7/1931 | Zuckerman ................ 171/126 |
| 1,907,467 | 5/1933 | Terro et al. ............... 56/328 R |
| 1,954,593 | 4/1934 | Kuly ......................... 171/110 X |
| 2,607,180 | 8/1952 | Stankavich .................. 56/330 |
| 2,679,133 | 5/1954 | Soderholm ................ 56/328 R |
| 2,852,082 | 9/1958 | Petersen ..................... 171/63 |
| 2,976,936 | 3/1961 | Fry ............................. 171/126 |

*Primary Examiner*—Russell R. Kinsey
*Attorney, Agent, or Firm*—James C. Wray

[57] ABSTRACT

A beach cleaner vehicle is drawn across sand. A scraper blade shaves a layer of sand and debris from the sand surface. A continuous conveyor transports the sand and debris over sifter bars within the chassis of the beach cleaner. A foraminous sifter separates debris and permits sand to fall back to the beach. The sifting process is enhanced by a system adapted to vibrate the foraminous sifter during operation of the beach cleaner. Debris is deposited in a trash basket which is hydraulically dumped.

26 Claims, 9 Drawing Figures

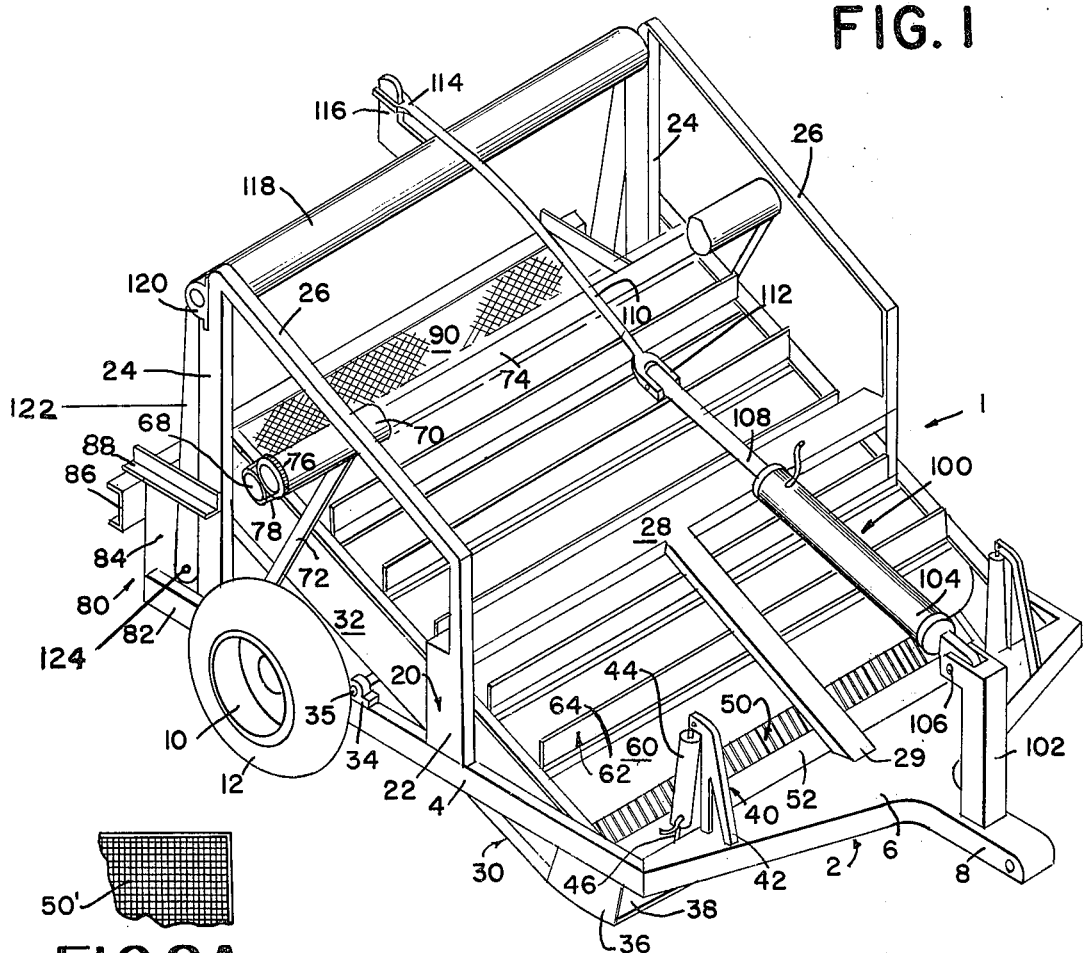
FIG. 1
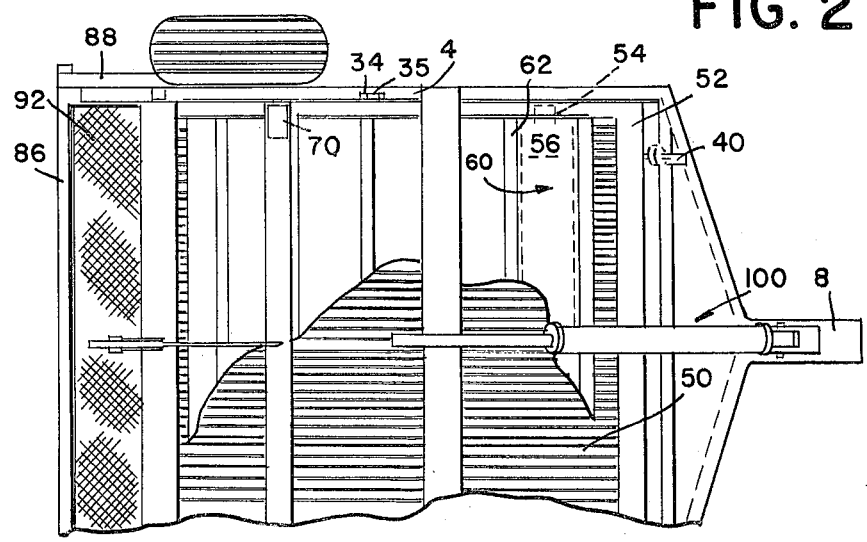
FIG. 2A
FIG. 2

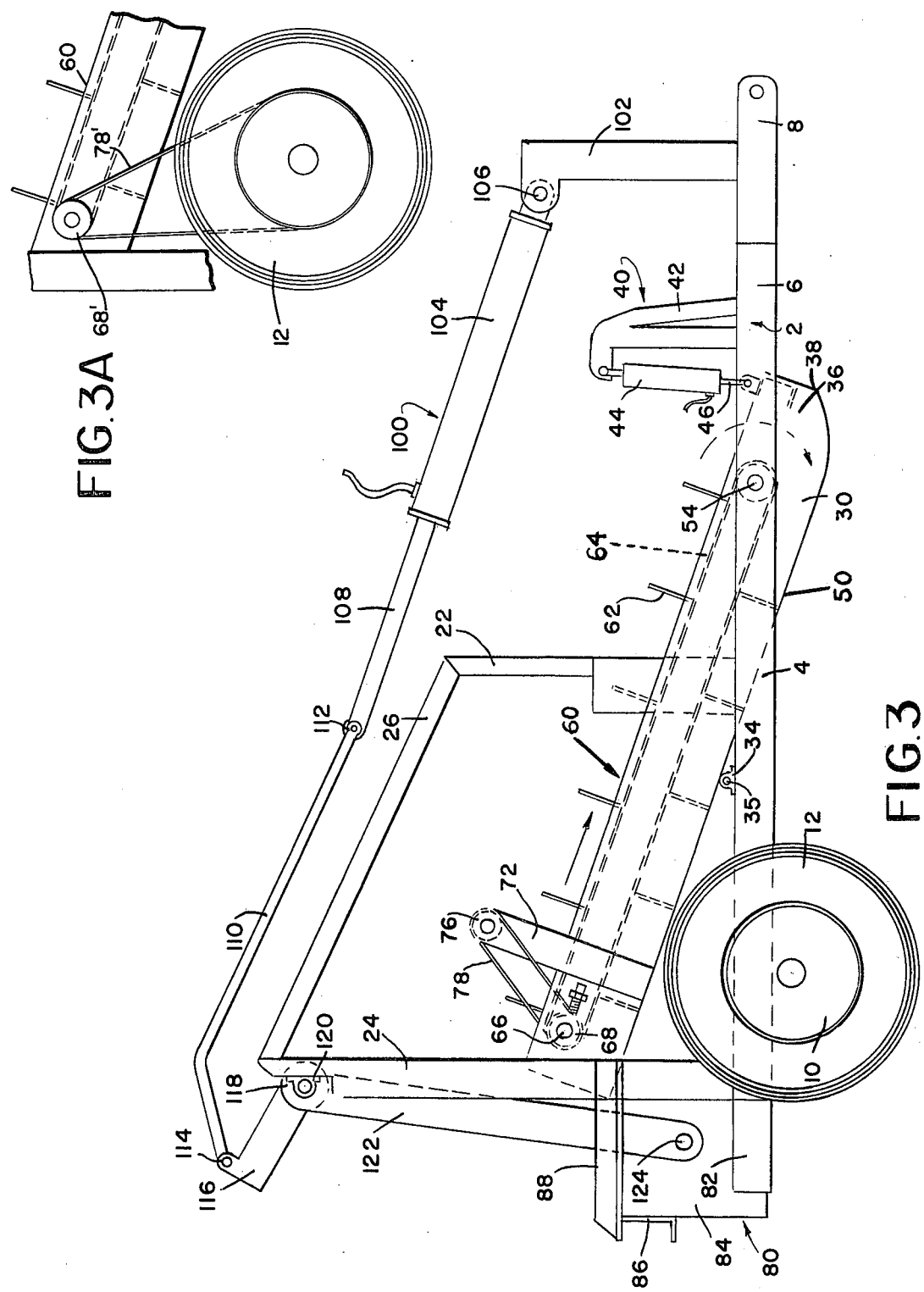

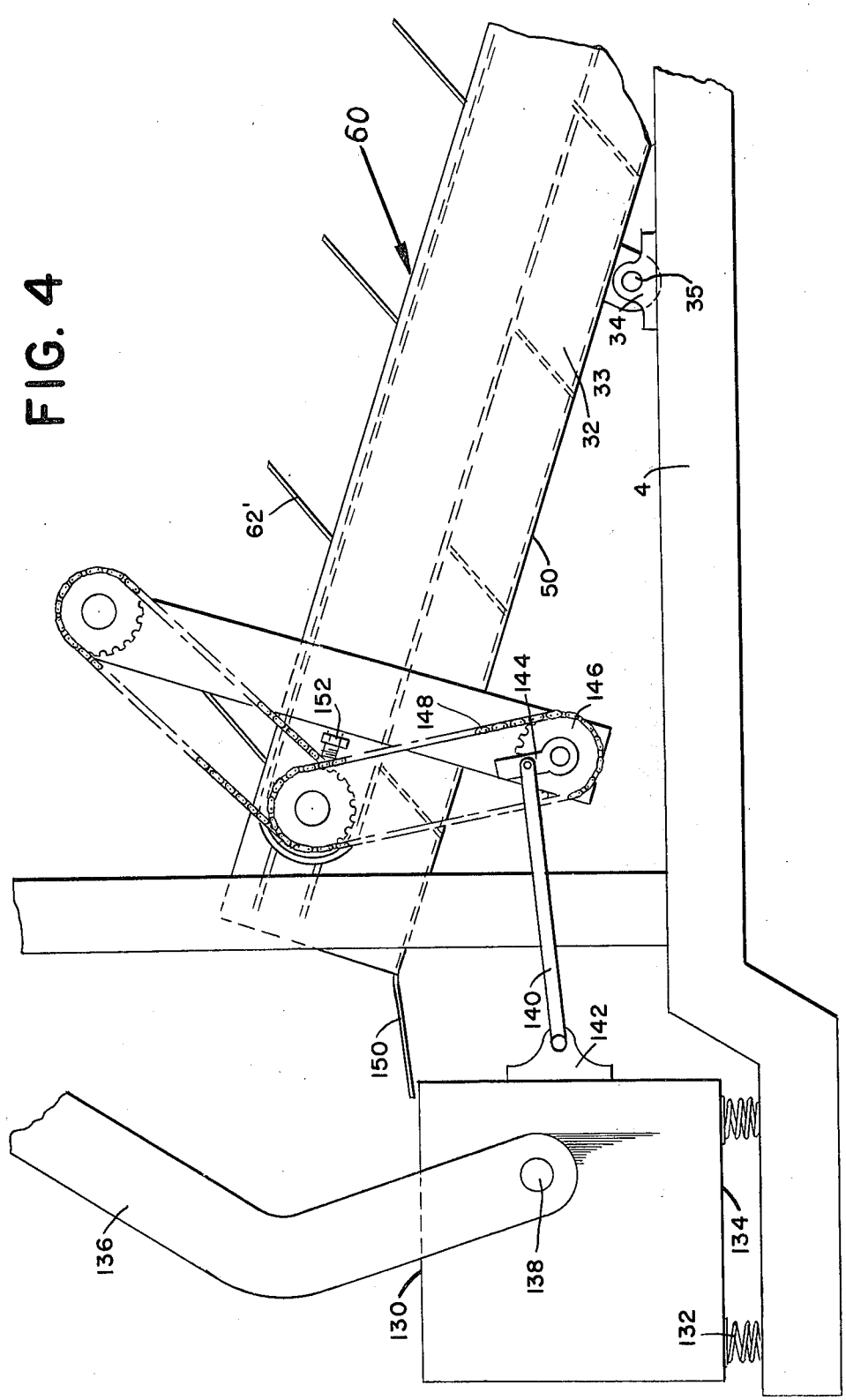

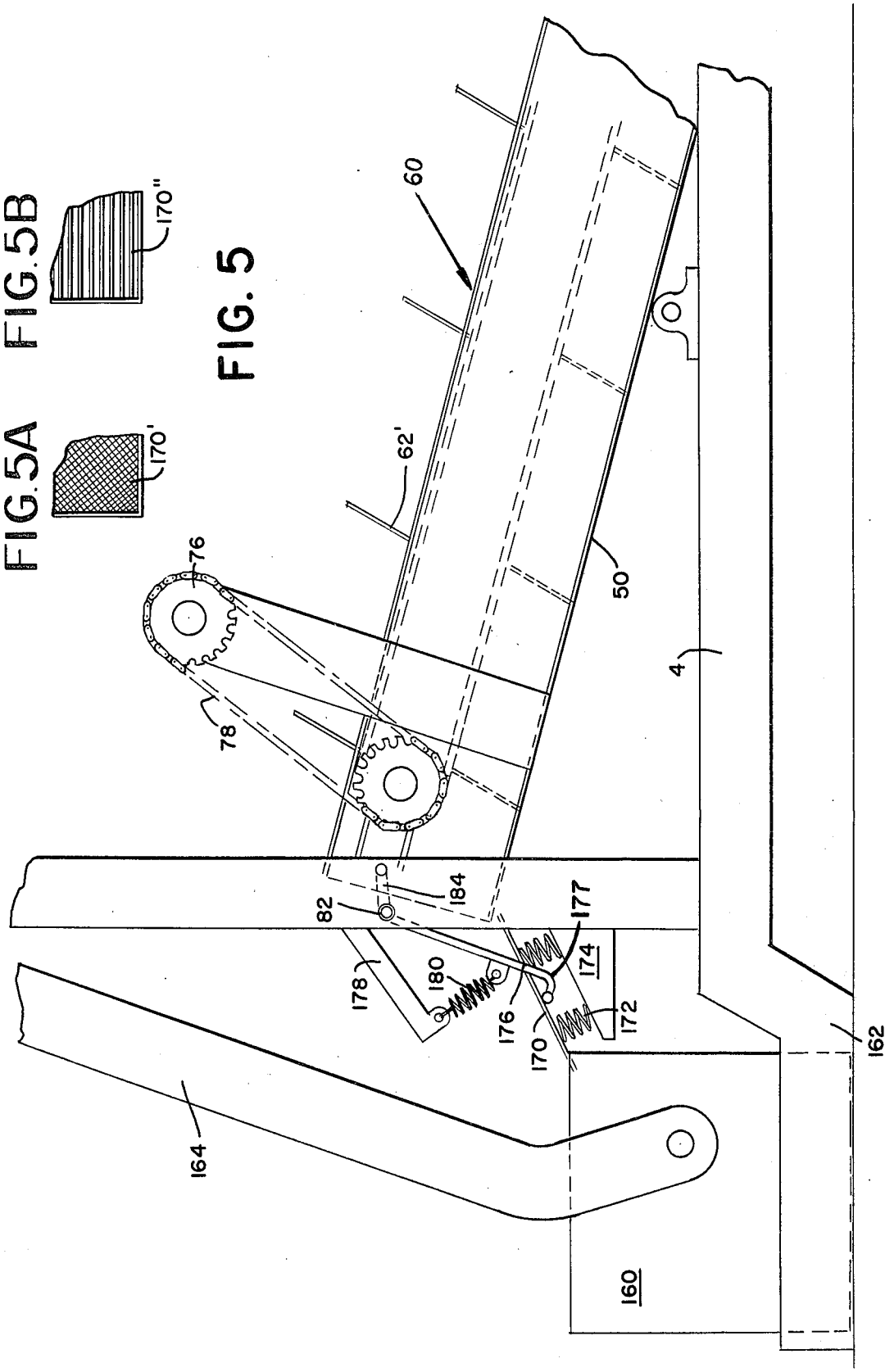

BEACH CLEANER APPARATUS

BACKGROUND OF THE INVENTION

The present invention is a beach sand cleaner which removes debris from the surface of sand when drawn across a beach.

The prior art contains disclosures of wheeled scooping, assorted raking, sweeping and vacuuming devices. A need exists for a scraping and cleaning machine particularly structured to remove debris from the surface of a beach; while preventing sand dislocation or build up or collection.

Before filing an application for letters patent, the applicant caused a search to be made.

A collection of devices of the type known in the prior art is found in U.S. Pat. Nos. 132,427; 1,085,162; 1,233,805; 1,563,340; and 2,783,698.

U.S. Pat. No. 1,085,162 describes a potato assortor employing a wheeled carriage, a manually adjustable ground scoop, a continuous conveyer, and an array of parallel bars performing a separation function. The potato assortor is designed to separate different sizes of potatoes. It's function is not to remove a surface layer from the ground, to clean the surface layer material, or to return the surface layer material to the ground.

U.S. Pat. No. 1,233,805 discloses a peanut harvester equipped wth an inclined, foraminous conveyor belt. The device is designed to separate peanuts and peanut vines from the earth in which they have grown.

SUMMARY OF THE INVENTION

The present invention concerns a beach cleaner apparatus, adapted to be drawn across a surface of sand to remove debris and to smooth the surface. The beach cleaner apparatus has a wheeled, vehicular chassis to which a sand cutting blade is attached. The sand cutting blade extends downward from the chassis at an oblique angle with respect to the surface of the sand so that the leading edge of the blade is pointed in the direction of forward motion of the chassis. As the apparatus is rolled along the beach, the blade shaves off a portion of the beach surface. In a preferred embodiment of the present invention, hydraulic cylinders are attached to the blade to raise and lower the blade, so to change the blade's angle of attack. Thus, the apparatus is adjusted to remove as thin or as thick a layer of sand as is required by particular beach conditions.

The sand and debris scraped by the cutting blade spill over the top of the blade where the sand and debris are moved by a continuous conveyor belt. In one configuration, the conveyor belt is inclined upward from the point at which the conveyor picks up the sand and debris from the cutting blade. A trash basket, located at the upper end of the conveyor path; receives the material carried by the conveyor belt.

The apparatus is equipped with three alternate sifting mechanisms, which are used singly or in combination, to separate sand from debris and to return sand to the beach in a uniform layer.

That portion of the machine over which the sand is swept can be changed to suit the conditions. The first type involves the use of spaced parallel bars over which the sand is swept. The second alternative uses a screen in place of the parallel bars, and, again, the sand is swept over the wire mesh. The third configuration uses a solid metal sheet over which the sand is swept into a basket. The basket is vibrated to sift out the sand but retain the larger debris.

In a preferred embodiment, the sand is swept to the rear of the machine by a rubber conveyor belt to which rubber blades are attached which do the actual "sweeping." The sand is swept over either the iron bars, wire mesh, or solid metal plate (whichever is selected for that job). As it passes over the bars (or the mesh), the sand falls through back to the beach while the rocks, cans, cigarette butts, etc., are swept along to a trash basket at the rear of the machine.

When the metal plate is used in place of the bars or mesh, everything is swept into the rear basket which is then vibrated to sift out the sand.

In one configuration of the present invention, the beach cleaner apparatus is equipped with a hydraulic emptying system for the trash basket. In this configuration, the trash basket rests on the vehicular chassis while being loaded by the continuous conveyor. The trash basket is lifted and tipped by an upwardly and rearwardly directed force exerted on the basket by a pivot-mounted lifting arm. The lifting arm itself is pivotally mounted to the chassis and is rotated about the pivot mount by a hydraulic actuation mechanism.

Hydraulic lines on the beach cleaner are attached to the hydraulic pump on the towing vehicle. The machine is pulled along the beach and the "cutting" edge is hydraulically lowered to make up to a two-inch "cut" into the sand. When the trash basket is full, it is hydraulically raised and dumped into a truck to be hauled away.

An object of the present invention is to provide a beach cleaning apparatus adapted to sift debris from beach sand and return the cleaned sand to the beach in a smooth layer.

Another object of the present invention is to provide a wheeled, vehicular beach cleaning apparatus with sand cutting blade, foraminous sifter, and continuous conveyor, whereby a thin layer of sand and debris is shaved from the beach and whereby the sand is sifted through to the beach and the debris is collected.

Another object of the present invention is to provide a beach cleaning apparatus employing an adjustable sand cutting blade which can be used to remove a layer of sand of any desired thickness.

Another object of the present invention is to provide a beach cleaner apparatus with a hydraulically emptying trash basket for the collection of debris removed from the surface of the sand.

Another object of the present invention is to provide a hydraulic emptying system for a beach cleaner trash basket composed of a platform on the vehicular chassis, an upward extending lifting arm pivotally mounted to the trash basket, a chassis frame member on which the lifting arm is pivotally mounted, and a hydraulically powered means for rotating the lifting arm about the chassis frame pivot mount.

Another object of the present invention is to provide a continuous conveyor with fins to sweep sand and debris over a sifting deck of the beach cleaning apparatus.

Another object of the present invention is to provide a beach cleaner apparatus with a vibrating foraminous surface through which sand is sifted from debris.

Another object of the present invention is to provide a beach cleaner with a vibrating sifter powered by the translation of the vehicular chassis.

Another object of the present invention is to provide a beach cleaner with a vibrating sifter powered by an electric motor and eccentric linkage.

Another object of the present invention is to provide a beach cleaner with a vibrating sifter powered by the motion of the continuous conveyor system.

Another object of the present invention is to provide a beach cleaning apparatus wherein debris is sifted from sand by a downward sloping, foraminous sifter plate mounted on the chassis between the conveyor and the trash basket.

Another object of the present invention is to provide a beach cleaner apparatus equipped with a vibrating trash basket formed with a foraminous bottom through which sand is sifted.

These and other objects and features of the invention are apparent from the disclosure which includes the specification and the drawings. The specification consists of the foregoing and ongoing descriptions and the claims.

BRIEF DESCRIPTION OF THE DRAWINGS

FIG. 1 is a perspective elevation of a preferred embodiment of the beach cleaner apparatus.

FIG. 2 is a plan detail of a preferred embodiment portions of which are broken away and omitted of the beach cleaner apparatus.

FIG. 2A is a detail of a screen or mesh sifting deck.

FIG. 3 is a side elevation of a preferred embodiment of the present invention.

FIG. 3A is a detail of a wheel driving the belt.

FIG. 4 is a detail of a side elevation of the present invention showing the vibrating trash basket of a preferred embodiment portions of which are broken away and omitted.

FIG. 5 is a detail of a side elevation of the present invention showing the vibrating, foraminous sifter plate of a preferred embodiment portions of which are broken away and omitted.

FIG. 5A is a detail of a wire mesh sifting plate.

FIG. 5B is a detail of a sifter plate made of parallel rods.

DETAILED DESCRIPTION OF THE DRAWINGS

Referring to FIG. 1 a preferred embodiment of the beach cleaner apparatus is denoted generally by the numeral 1. A vehicular chassis 2 is formed by a front member 6, parallel side members 4 and a rear cross member. The chassis 2 is supported above the surface of the beach by rotatably mounted wheels 10 with tires 12 on either side of the chassis. A hitch 8 is provided so that the beach cleaner apparatus can be pulled along the surface of a beach by a powered vehicle. An upper portion 20 of the vehicular chassis is composed of vertical members 22 and 24 supported by frame braces 26, 28, and 29.

A sand cutting blade, conveyor and sifting deck are denoted generally by the numeral 30. Parallel side I beams 32 provide basic support for the conveyor and laterally restrain sand on the conveyor. Pillow blocks 34 hold rod 35 which extends beneath beams 32 to hold the conveyor 30 in a rotatable position with respect to chassis 2. Dependent lugs 33 on beams 32 are connected to rod 35, as shown in detail in FIG. 4. The sand cutting blade 38 is attached to beams 32, which form the conveyor housing. Lateral vertical blades 36 divide sand to be conveyed from sand left on the beach. In one configuration, the blade and conveyor assembly can be raised and lowered by a hydraulic system 40 composed of vertical supports 42, hydraulic cylinders 44, and attachment linkage 46.

Sand and debris reaching the upper edge 52 of the sand cutting blade passes onto the sifting deck 50, shown in the figures as an array of spaced, parallel bars. The sifting deck forms the bottom face of the sifter-conveyor assembly 30.

A continuous conveyor, denoted generally by the numeral 60, has resilient fins 62 mounted generally perpendicular at intervals on a continuous flexible belt 64. The conveyor is designed to sweep sand and debris rearward and upward over the sifting deck 50. A shaft 66 drives a powered roller in a pair of connected coaxially with gear 68 on shafts 66 and 54 that support belt 64. Shaft 66 is driven by gear 68.

Hydraulic or electric motors 70 are supported above conveyor frames 32 by frame members 72. Motors 70 have gears 76 which drive chains 78 to turn roller gears 68 and roller shaft 66.

Debris captured by the conveyor and sifting deck is deposited in open-top trash basket 80 which is held in position between platform channels 82 which extend rearward from side members 4. The basket is lifted rearward hydraulically.

In one embodiment, the basket sides 84 are connected rearwardly to a channel beam 86, and angle iron guides 88 extend forward from the channel beam. Screen back 90 and bottom 92 and a front screen wall complete the upward opening basket 80.

A hydraulic basket emptying system is generally referred to by the numeral 100. Vertical support 102 extends upward from frame 2 at forward extending hitch 8. Hydraulic cylinder 104 is connected to upright 102 by clevis 106. Cylinder 104 draws in piston 108. Connecting rod 110, via clevises 112 and 114 pulls lug 116 forward, turning shaft 118, rotatably supported in blocks 120, which are attached to upright frame members 24. Arms 122 which are connected to shaft 118 are lifted rearward, lifting basket 80 by pivotal stub-shafts 124 attached to side walls 84. In one embodiment, as basket 80 moves rearward, heavy channel member 86 tips the basket rearward around lugs 124, dumping the basket. The weight of the basket 80 and arms 122 pull the basket forward, and the basket tips up into debris-receiving position on platform 82.

FIG. 2 is a plan view of the preferred embodiment of the present invention. The figure shows the relative positions of the trash basket 80, bottom 92, trash basket brace 86, side frame member 88, and the continuous conveyor 60. The cut away portion of the figure shows the entire length of sifting deck 50, as well as a conveyor supporting roller 56 mounted to the frame at 54, and the hydraulic systems denoted generally by numerals 40 and 100.

FIG. 2A shows a screen mesh sifting deck 50'.

As shown in FIG. 3A, the continuous conveyor 60 further comprises a power takeoff linkage 78' to transmit rotational motion from wheels 12 by which the vehicle chassis is supported to the supporting rollers 68', whereby the continuous conveyor 60 is powered by rolling the beach cleaner apparatus across the surface of the sand.

FIG. 4 shows another embodiment of the present invention wherein the debris is separated from the sand by a vibrating trash basket 130. A debris and sand mixture is carried to the basket by continuous conveyor 60 and feeding plate 150. The trash basket is vibrated so that the debris is retained while sand falls through a bottom 134 of the trash basket. When the basket is filled with debris it is dumped by lifter arm 136 attached at the first pivot point 138.

The trash basket rests on spring mountings 132 in such a way that it is free to vibrate. A distal portion of a vibration transfer arm 140 is pivotably mounted to the side of the trash basket by bracket 142. The proximal portion of transfer arm 140 is pivotably mounted to eccentric arm 144 which, itself is rigidly fixed to drive gear 146. The drive gear is rotated by power transmitted to it from the electric motor by chain linkage 148.

FIG. 5 shows another embodiment of the present invention wherein debris and sand are separated by an apertured, vibrating sifter plate 170. The sand and debris mixture is carried to the downward sloping, sifter plate 170 by conveyor 60. The separated debris is ultimately deposited in trash basket 160. When the basket is loaded it can be lifted from platform 162 by the lifter arm 164 as shown in FIG. 5A, the sifter plate 170' may be constructed of wire mesh. As shown in FIG. 5B, sifter plate 170'' may be constructed of parallel rods.

The sifter plate is attached to chassis platform 174 by spring mountings 172. The plate is vibrated by rachet arm 176 which is rotatably mounted to a third pivot point 82. A first portion 177 of the rachet arm is maintained in contact with the sifter plate by a spring retainer 180 and its support brace 178. A second portion 184 of the rachet arm is in a position, to make intermittant contact with the moving fins 62' of the continuous conveyor. This mechanisms allows the sifter to be vibrated by the reciprocating motion of the rachet arm which motion is induced by the passage of the conveyor fins.

While the invention has been described with reference to specific embodiments, it will be obvious that modifications and variations may be constructed without departing from the spirit and scope of the invention. The scope of the invention is described in the following claims.

I claim:

1. A beach cleaner apparatus comprising
a wide vehicular chassis for moving across a surface of sand,
a wide continuous conveyor, attached to the vehicular chassis and extending across the chassis, for carrying sand and debris removed from a surface of sand along a conveyor run in the vehicular chassis,
a sifting deck having lateral beams attached to the vehicular chassis and lying below the prescribed path through which the sand and debris are carried by the continuous conveyor, which sifting deck is formed with a plurality of apertures of sufficient dimensions to permit grains of sand to fall through to the beach and of sufficient dimension to block the passage of debris; and
a sand lifting blade, attached to a lower end of the sifting deck and extending forward beyond the conveyor, which sand lifting blade extends downward from the vehicular chassis into the sand at an oblique angle with respect to the surface of the sand such that a lifting edge of the sand lifting blade is pointed in a direction of forward motion of the vehicular chassis;
a transverse medial pivot rod connected to pillow blocks on the dependent chassis and to lugs on lateral beams of the sifting deck for pivoting the sifting deck and the attached lifting blade from front to rear at an approximate central area of the deck, and hydraulic actuators connected between the sand lifting edge and the chassis to raise and lower the sand lifting edge to adjust a depth of entry of the cutting edge into a surface of sand;
whereby, a thin layer of sand and debris is shaved from the surface of the sand by the sand lifting blade; and whereby, debris is separated from the sand by the subsurface sand lifting blade; and whereby, debris is separated from the sand by the sifting deck over which the sand and debris are drawn by the continuous conveyor, the sand being returned to the beach, and the debris being collected.

2. The beach cleaner apparatus of claim 1 further comprising trash basket mounted on the chassis near a rearward end of the sifting deck, the trash basket having an upward opening mouth for receiving debris from an uppermost end of the continuous conveyor.

3. The beach cleaner apparatus of claim 2 further comprising a hydraulic emptying system for the trash basket comprising
a platform on the vehicular chassis on which the trash basket is rested when being loaded with debris by the continuous conveyor,
an upward extending lifting arm, pivotably mounted to a side of the trash basket at a first pivot point, so that the trash basket is tipped in a rearward direction for emptying when the trash basket is raised from its platform and translated rearward by the lifting arm,
a generally upward extending chassis frame member, to an upper portion of which an upper end of the lifting arm is pivotably attached at a second pivot point, and
a hydraulically powered means connected to the lifting arm for rotating the lifting arm in a rearward direction about the second pivot point;
whereby, a trash basket resting on the platform for loading is unloaded by lifting and tipping the trash basket by means of an upward and rearward directed force exerted on the first pivot point on the basket by the pivoting lifting arm.

4. The beach cleaner apparatus of claim 3 wherein the hydraulically powered means for rotating the lifting arm comprises
an offset arm with a proximal portion pivotably mounted at the second pivot point and attached to the lifting arm so that the offset arm and the lifting arm form a fixed oblique angle,
a drawing arm pivotably mounted to a distal portion of the offset arm, and
a hydraulic cylinder connected to the drawing arm for retracting the drawing arm so that the trash basket is lifted and translated from the platform on the vehicular chassis.

5. The beach cleaner apparatus of claim 1 wherein the continuous conveyor comprises
a flexible conveyer belt formed in a continuous loop,
conveyor fins mounted approximately vertically at intervals along the conveyor belt to move the sand along the sifting deck, and
parallel supporting rollers mounted on the sifting deck about which the continuous loop of conveyor belt is movably mounted, which supporting rollers are located in such positions that the conveyor fins draw the sand and debris across the sifting deck.

6. The beach cleaner apparatus of claim 5 wherein the continuous conveyor further comprises a power driving unit connected to the conveyor belt to move the continuous loop of conveyor belt along a path defined by the supporting rollers.

7. The beach cleaner apparatus of claim 5 wherein the continuous conveyor further comprises a power takeoff linkage to transmit rotational motion from wheels, by which the vehicular chassis is supported, to the supporting rollers; whereby the continuous conveyor is powered by rolling the beach cleaner apparatus across the surface of the sand.

8. The beach cleaner apparatus of claim 5 wherein the conveyor fins are mounted on the conveyor belt so that they are angled forward in a direction of travel of the conveyor belt.

9. The beach cleaner apparatus of claim 1 wherein the sifting deck comprises an array of evenly spaced parallel bars, the apertures therein being spaces between the bars.

10. The beach cleaner apparatus of claim 1 wherein the sifting deck comprises a wire mesh.

11. Beach cleaner apparatus of claim 1 further comprising
means for vibrating the trash basket, whereby, sand and debris are scraped from the surface of the sand, conveyed to a trash basket and sifted by vibrating the sand through a mesh bottom of the trash basket.

12. The beach cleaner apparatus of claim 11 wherein the means for vibrating the trash basket comprises
spring mountings attaching the trash basket to the vehicular chassis,
a motor driven eccentric arm which rotates about an axis passing through a proximal end of the eccentric arm,
a vibration transfer arm, with a proximal portion pivotably mounted to a distal end of the eccentric arm so that an axis of rotation of the transfer arm is parallel to the axis passing through the proximal end of the eccentric arm, and with a distal portion of said transfer arm pivotably mounted to a side of the trash basket so that an axis of rotation of the transfer arm about its point of attachment to the trash basket is parallel to the axis passing through the proximal end of the eccentric arm.

13. The beach cleaner apparatus of claim 1 further comprising a downward sloping foraminous sifter plate mounted on the chassis between the conveyor and the trash basket to pass debris to the trash basket, and means connected to the plate for vibrating the plate and shaking sand through apertures in the plate.

14. A beach cleaner apparatus of claim 1 further comprising
a downward sloping, sifter plate to receive the sand and debris from an uppermost end of the continuous conveyor, which sifter plate is formed with a plurality of apertures of sufficient dimensions to permit grains of sand to fall through to the beach, and of sufficient dimensions to block the passage of debris,
means for vibrating the sifter plate, and
a trash basket with an upward opening mouth mounted on the chassis to receive debris from a lower portion of the sifter plate;
whereby, sand and debris are scraped from the surface of sand, and conveyed to the sifter plate where sand and debris are separated; the sand falling to the beach and the debris deposited in the trash basket.

15. The beach cleaner apparatus of claim 14 wherein the continuous conveyor comprises
a flexible conveyor belt formed in a continuous loop,
conveyor fins mounted approximately vertically at intervals along the conveyor belt to move the sand along the prescribed path, and
supporting rollers about which the continuous loop of conveyor belt is movably mounted.

16. The beach cleaner apparatus of claim 15 wherein the means for vibrating the sifter plate comprises
spring mountings for attaching the sifter plate to the vehicular chassis,
a ratchet arm rotatably mounted at a third pivot point to the vehicular chassis, a first portion of which ratchet arm extends from the third pivot point to a point at which intermittant translational contact is made with the conveyor fins; a second portion of which ratchet arm extends in an approximately opposite direction from the first portion and is attached to the sifter plate, and
a spring retainer, attached to the second portion of the ratchet arm, so that it opposes movement of the ratchet arm due to motion of the conveyor fins;
whereby, the sifter plate is vibrated by reciprocating motion of the pivot-mounted ratchet arm which is rotated in one direction by passage of the conveyor fins and which is rotated in an opposite direction by the spring retainer when no conveyor fin is contacting the ratchet arm.

17. The beach cleaner apparatus of claim 14 further comprising a hydraulic emptying system for the trash basket comprising
a platform of the vehicular chassis on which the trash basket is rested when being loaded with debris by the continuous conveyor,
an upward extending lifting arm, pivotably mounted to a side of the trash basket at a first pivot point near, so that the trash basket is capable of being tipped in a rearward direction for emptying when the trash basket is raised from its platform and translated rearward by the lifting arm,
a generally upward extending chassis frame member, to an upper portion of which an upper end of the lifting arm is pivotably attached at a second pivot point, and
a hydraulically powered means for rotating the lifting arm in a rearward direction about the second pivot point;
whereby, the trash basket rested on a stationary platform for loading is unloaded and by lifting and tipping the trash basket by means of an upward and rearwardly directed force exerted on the first pivot point on the basket by the pivoting lifting arm.

18. The beach cleaner apparatus of claim 17 wherein the hydraulically powered means for rotating the lifting arm comprises
an offset arm with a proximal portion pivotably mounted at the second pivot pointed and attached to the lifting arm so that the offset arm and the lifting arm form a fixed oblique angle,
a drawing arm pivotably mounted to a distal portion of the offset arm, and
a hydraulic cylinder for retracting the drawing arm so that the trash basket is lifted and translated from the platform on the vehicular chassis.

19. The beach cleaner apparatus of claim 14 wherein the vehicular chassis comprises an approximately rectangular undercarriage frame a pair of wheels rotatably mounted on either side of a rearward portion of the undercarriage frame so that the wheels support the undercarriage frame and permit the undercarriage beach cleaner apparatus to be drawn across the surface of the sand.

20. The beach cleaner apparatus of claim 19 further comprising a vehicle hitch attached to a frontward portion of the undercarriage frame; whereby, the beach cleaner apparatus is drawn across the surface of the sand by a powered vehicle.

21. The beach cleaner apparatus of claim 17 further comprising hydraulic cylinders connected between the chassis and the sand cutting edge to raise and lower the sand cutting edge to adjust a depth of entry of the cutting edge into the surface of the sand.

22. The beach cleaner apparatus of claim 14 wherein the continuous conveyor further comprises a motor driving unit to move the continuous loop of conveyor belt along a path defined by the supporting rollers.

23. The beach cleaner apparatus of claim 14 wherein the continuous conveyor further comprises a power takeoff linkage to transmit rotational motion from wheels, by which the vehicular chassis is supported, to the supporting rollers; whereby the continuous conveyor is powered by rolling the beach cleaner apparatus across the surface of the sand.

24. The beach cleaner apparatus of claim 14 wherein the conveyor fins are mounted on the conveyor belt so that they are angled forward in a direction of travel of the conveyor belt.

25. The beach cleaner apparatus of claim 14 wherein the sifting plate comprises an array of evenly spaced parallel bars, apertures therein being the spaces between the bars.

26. The beach cleaner apparatus of claim 14 wherein the sifting plate comprises a wire mesh, apertures therein being regions between wires composing the mesh.

* * * * *